(12) United States Patent
Tai

(10) Patent No.: US 6,946,658 B2
(45) Date of Patent: Sep. 20, 2005

(54) METHOD AND APPARATUS FOR INCREASING SPATIAL RESOLUTION OF A PET SCANNER

(75) Inventor: Yuan-Chuan Tai, St. Louis, MO (US)

(73) Assignee: The Washington University, St. Louis, MO (US)

( * ) Notice: Subject to any disclaimer, the term of this patent is extended or adjusted under 35 U.S.C. 154(b) by 0 days.

(21) Appl. No.: 10/439,697

(22) Filed: May 16, 2003

(65) Prior Publication Data

US 2004/0004188 A1 Jan. 8, 2004

Related U.S. Application Data

(60) Provisional application No. 60/394,135, filed on Jul. 5, 2002.

(51) Int. Cl.[7] ................................................. G01T 1/17
(52) U.S. Cl. .............................. 250/363.03; 250/363.04
(58) Field of Search ....................... 250/363.03, 363.04, 250/363.02, 363.01, 336.1, 370.08, 370.09, 366, 367, 368, 369

(56) References Cited

U.S. PATENT DOCUMENTS

| | | | |
|---|---|---|---|
| 4,473,749 A | | 9/1984 | Derenzo et al. |
| 4,559,597 A | * | 12/1985 | Mullani ........................ 600/407 |
| 4,647,779 A | | 3/1987 | Wong |
| 4,743,764 A | | 5/1988 | Casey et al. |
| 4,833,327 A | * | 5/1989 | Hart ........................ 250/363.01 |
| 4,980,552 A | * | 12/1990 | Cho et al. ............... 250/363.03 |
| 5,103,098 A | * | 4/1992 | Fenyves ..................... 250/368 |
| 5,122,667 A | | 6/1992 | Thompson |
| 5,532,489 A | | 7/1996 | Yamashita et al. |
| 5,567,944 A | | 10/1996 | Rohe et al. |
| 5,665,971 A | * | 9/1997 | Chen et al. ............... 250/385.1 |
| 5,719,400 A | | 2/1998 | Cherry et al. |
| 5,742,056 A | * | 4/1998 | Valentino et al. ........ 250/363.03 |
| 5,760,401 A | * | 6/1998 | Nelleman et al. ....... 250/363.03 |
| 5,825,031 A | * | 10/1998 | Wong et al. ............ 250/363.03 |
| 5,965,891 A | | 10/1999 | Weinberg |
| 6,140,650 A | * | 10/2000 | Berlad ..................... 250/363.09 |
| 6,388,244 B1 | * | 5/2002 | Gagnon .................... 250/208.1 |
| 6,459,085 B1 | | 10/2002 | Chang et al. |
| 6,484,051 B1 | | 11/2002 | Daniel |
| 6,545,280 B2 | | 4/2003 | Weinberg |
| 6,723,993 B2 | | 4/2004 | Cooke et al. |
| 6,727,502 B1 | * | 4/2004 | Matthews et al. ...... 250/363.03 |

OTHER PUBLICATIONS

Hoffman, Edward J., et al., *An Analysis of Some of the Physical Aspects of Positron Transaxial Tomography*, Comput. Biol. Med., vol. 6, pp. 345–360 (1976).

Phelps, Michael E., et al., *Application of Annihilation Coincidence Detection to Transaxial Reconstruction Tomography*, Journal of Nuclear Medicine, vol. 16, No. 3, pp. 210–224.

Jeavons, A.P., et al., *A 3D HIDAC–PET Camera with Sub–millimetre Resolution for Imaging Small Animals*, IEEE Transactions on Nuclear Science, vol. 46, No. 3, pp. 468–473 (1999).

Virador, P.R.G., et al., *Reconstruction in PET Cameras with Irregular Sampling and Depth of Interaction Capability*, Submitted IEEE Transactions on Medical Imaging.

(Continued)

Primary Examiner—Otilia Gabor
(74) Attorney, Agent, or Firm—Sonnenschein Nath & Rosenthal LLP; Kirill Y. Abramov

(57) ABSTRACT

A method and apparatus for increasing the resolution of a Positron Emission Tomography scanner. The method and apparatus comprise elements and acts for centering a region of interest of an object at a point between first and second detector arrays which is at least about ten percent closer to the first detector array than to the second detector array.

31 Claims, 12 Drawing Sheets

OTHER PUBLICATIONS

Weber, Simone, et al., *The Design of an Animal PET: Flexible Geometry for Achieving Optimal Spatial Resolution or High Sensitivity*, IEEE Transactions on Medical Imaging, vol. 16, No. 5, pp. 684–689 (1997).

Rouze, Ned C., et al., *Design of IndyPET–II, a High–Resolution, High–Sensistivity Dedicated Research Scanner*, IEEE, 5 PAGES (2002).

Chatziioannou, A., et al., *Detector development for microPET II:a 1 µl resolution PET scanner for small animal imaging*, Phys. Med. Biol. 46, pp. 2899–2910 (2001).

Bartzakos, P., et al., *A Depth–Encoded PET Detector*, IEEE Transactions on Nuclear Science, vol. 38, No. 2, pp. 732–738 (1991).

Cho, Z.H., et al., *A New Approach to Very High Resolution Mini–Brain PET Using a Small Number of Large Detectors*, IEEE Transactions on Nuclear Science, vol. 37, No. 2, pp. 842–851 (1990).

Chatziioannou, A., et al., *Techniques to Improve the Spatial Sampling of MicroPET—A High Resolution Animal PET Tomograph*, IEEE Transactions on Nuclear Science, vol. 47, No. 2, pp. 422–427 (2000).

Derenzo, Stephen E., et al., *Imaging Properties of a Positron Tomograph with 280 BGO Crystals*, IEEE Transactions on Nuclear Science, vol. NS–28, No. 1, pp. 81–89 (1981).

* cited by examiner

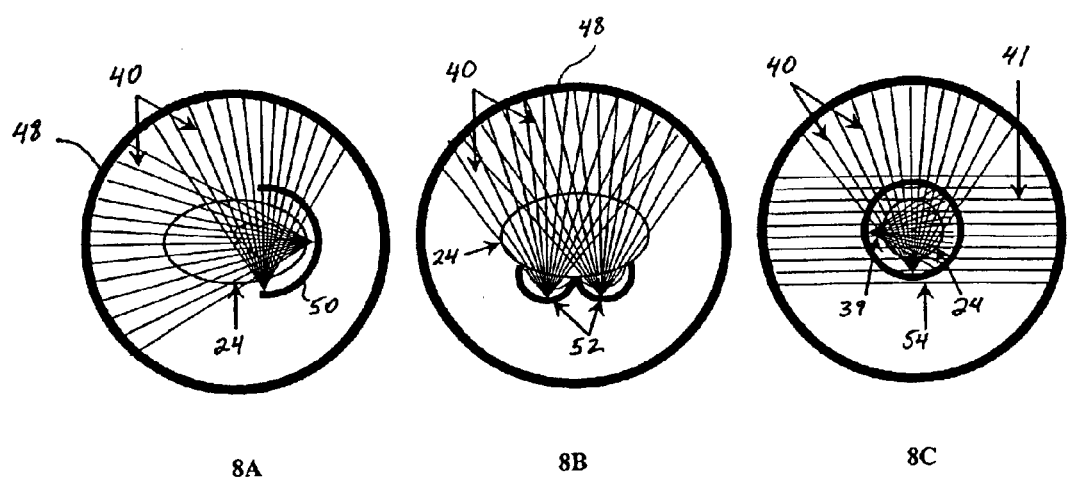
8A    8B    8C
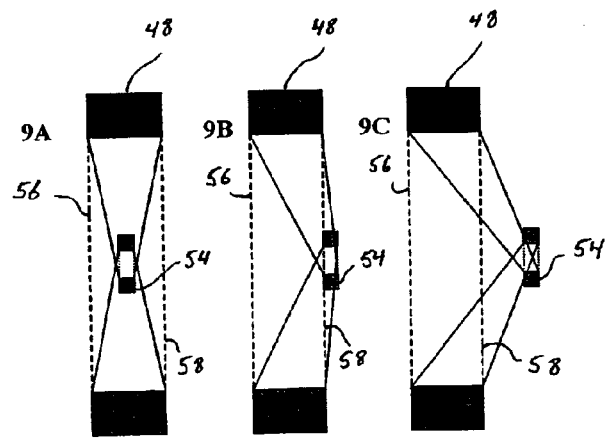
9A    9B    9C

METHOD AND APPARATUS FOR INCREASING SPATIAL RESOLUTION OF A PET SCANNER

This application is based upon and claims priority from a U.S. Provisional Application No. 60/394,135 filed on Jul. 5, 2002.

BACKGROUND OF THE INVENTION

The present invention relates generally to Positron Emission Tomography ("PET") scanners, and more particularly to a method of PET scanning and a PET scanner apparatus having increased image resolution.

Positron Emission Tomography ("PET") is an imaging technique that provides three-dimensional tomographic images of a distribution of positron-emitting isotopes within an object. The object is usually a living human or animal, and the images provide a visual depiction of tissue differences within different portions of the object. A PET procedure involves the introduction of radiolabeled tracing pharmaceuticals into the object, usually through injection or inhalation. The type of pharmaceuticals depends on the function of the tissue under investigation. As the radiolabeled tracing element in the pharmaceutical decays, it produces positrons. Each positron collides with surrounding matter in the sample object before combining with an electron in the sample object. The combination of each positron with an electron in the sample object annihilates both particles, producing a pair of gamma-ray photons. The gamma-ray photons travel away from the annihilation event in opposite directions. If a pair of opposing gamma-ray detectors each detect one of the two gamma-ray photons produced in the annihilation event within a predetermined period of time, usually 5 to 50 nanoseconds, a "coincidence event" is recorded, and it is assumed that the annihilation event producing the gamma-ray photons lies along a straight line between the two detectors.

Conventionally, a PET scanner consists of arrays of gamma-ray detectors, arranged either continuously as one or multiple rings, or as two or more detector plates. Lines of response ("LOR") are formed between opposing detector pairs in each array. The PET scanner obtains the radioactivity distribution information within the object by detecting annihilation events originating along each LOR. Commercially available PET scanners having one or more rings of detectors are available for PET scanning animal and human subjects. The inside diameters of the one or more rings of detectors for PET scanning animal and human subjects are approximately 20 centimeters and 80 centimeters, respectively. Conventionally, for scanners having detectors arranged in a ring(s), the object is placed at the center of the ring(s) where the sampling is believed to be the highest, hence achieving the best resolution and image quality currently available. For scanners having detector plates, the detector plates rotate around the object to collect data from all angles in order to form a complete set of projections of the distribution. For the same reason as in the ring configuration, the object is conventionally centered between the detector plates. The detection of a large number of annihilation events allows a computer to construct a three-dimensional image of the distribution of radiolabeled pharmaceuticals within the object, which provides valuable information on the kinetics of the pharmaceuticals and functions of the living object.

With these conventional designs, the image spatial resolution of a PET system is determined by several factors, including intrinsic detector spatial resolution, acolinearity of the annihilating gamma ray photons, and positron range of the radioisotopes in the tracing pharmaceuticals. Of these three factors, the last two depend on the type of radioisotopes used and are independent of the scanner design. Therefore, PET scanner manufacturers have been trying to improve scanner spatial resolution by designing new detectors that improve the detector's intrinsic spatial resolution. This is particularly important for very high resolution PET scanners dedicated to small animal imaging, which have become a very powerful tool for the advancement of molecular imaging.

For most animal PET scanners and some state-of-the-art human scanners, discrete scintillation crystals coupled to photodetectors have been used to achieve the highest spatial resolution heretofore possible. For a PET scanner using discrete crystals, the detector intrinsic spatial resolution can not be better than one half of the crystal width. For a PET scanner with ring geometry, the detector pairs form sampling lines with an average sampling distance of half a crystal width. Based on the Nyquist theorem in sampling theory, the smallest object (i.e., the highest frequency of signal) that one system can resolve is twice the size of the sampling distance (i.e., half of the sampling frequency). In order to achieve image spatial resolution that approaches the theoretical limit, where the detector intrinsic spatial resolution equals one half the crystal width, conventional PET scanners require smaller sampling distances. Many attempts have been made to increase the sampling resolution. For example, certain designs move the detector or the object by a fraction of the detector width. Other designs stack discrete crystals in multiple offset layers. With these designs, image resolution can begin to approach the detector intrinsic resolution. However, conventional PET scanners have been unable to achieve image resolution higher than the detector intrinsic spatial resolution regardless of the type of gamma-ray detector employed. This is true for PET scanners with scintillation detectors, ionization chambers, semiconductor detectors and other types of gamma-ray detectors.

Several techniques have been developed in other imaging arts to resolve structures smaller than the detector intrinsic spatial resolution. One example is a gamma camera coupled to a pinhole collimator that produces a "magnified" image of the object, allowing image resolution of objects smaller than the detector intrinsic spatial resolution. The drawback of this design is a significant reduction of detecting efficiency.

An example of another imaging device is a Compton camera having two detectors placed to one side of a photon source. The detectors of a Compton camera are designed to sequentially detect a photon that interacts with one and then the other detector. The interaction with the first detector is through the Compton effect while the interaction with the second detector is through the photoelectric effect. The sequential detection of a photon enables the Compton camera to trace the photon's path without using mechanical collimators, such as those in a gamma camera. Therefore, a Compton camera has better sensitivity than the conventional gamma camera. The disadvantage of a Compton camera is its reduced resolution compared with a conventional gamma camera. In contrast to apparatus of the present invention, both detectors of the Compton camera are positioned on one side of a photon source and detect a single photon sequentially. In the present invention detectors positioned in opposite sides of a photon source each detect separate photons traveling in opposite direction from the coincidence event. Also, in contrast to the Compton camera, the present invention does not rely on Compton effect interactions to produce images of the object.

SUMMARY OF THE INVENTION

Briefly, the apparatus of this invention is a PET scanner for providing an enhanced resolution image of a region of interest of an object. The scanner comprises opposing first and second detector arrays spaced by a distance and a stage for holding the object between the first and second detector arrays. The detectors of the first detector array have an intrinsic spatial resolution that is equal to or better than the intrinsic spatial resolution of the detectors of the second detector array. The stage is located to center the region of interest of the object at a point between the first and second detector arrays. The point is at least about ten percent closer to the first detector array than to the second detector array.

In another aspect of the invention, the point is at least about one centimeter closer to the first detector array than to the second detector array, and the distance between the two detector arrays is about twenty centimeters.

In another aspect of the invention, the point is at least about four centimeters closer to the first detector array than to the second detector array, and the distance between the two detector arrays is about eighty centimeters.

In yet another aspect, the present invention is a PET scanner comprising opposing first and second detector arrays and a stage for holding the object between the first and second detector arrays. In this aspect of the invention, the first and second detector arrays are each formed as an arc of a circle, with the radius of the arc of the first detector being less than the radius of the arc of the second detector array. The detectors of the first detector array have an intrinsic spatial resolution that is equal to or better than the intrinsic spatial resolution of the detectors of the second detector array. The stage is located to center the region of interest of the object at a point between the first and second detector arrays. The point is at least about ten percent closer to the first detector array than to the second detector array.

In still another aspect, the present invention includes a scanner comprising a first circular detector array, a second circular detector array extending at least partially outside the first detector array, and a stage for holding the object inside the first and second detector arrays. The detectors of the first detector array have an intrinsic spatial resolution that is equal to or better than the intrinsic spatial resolution of the detectors of the second detector array.

In yet another aspect, the present invention includes a method for increasing scanner resolution. The method comprises centering the region of interest of the object at a point between the first and second detector arrays which is at least about ten percent closer to the first detector array than to the second detector array, and scanning the object with the scanner.

In still another aspect of the invention, the region of interest of the object is centered at a point between the first and second detector arrays which is at least about one centimeter closer to the first detector array than to the second detector array, wherein the distance between the two detector arrays is twenty centimeters.

In still another aspect of the invention, the region of interest of the object is centered at a point between the first and second detector arrays which is at least about four centimeters closer to the first detector array than to the second detector array, wherein the distance between the two detector arrays is eighty centimeters.

In yet another aspect of the invention, a method of PET scanning is provided using a PET scanner comprising opposing first and second detector arrays that are each formed as an arc of a circle, with the radius of the arc of the first detector being less than the radius of the arc of the second detector array. The detectors of the first detector array have an intrinsic spatial resolution that is equal to or better than the intrinsic spatial resolution of the detectors of the second detector array. The method comprises centering the region of interest of the object at a point between the first and second detector arrays which is at least about ten percent closer to the first detector array than to the second detector array, and scanning the object with the scanner.

In another aspect, the present invention includes a method of increasing resolution of an image of a region of interest of an object provided by a positron emission tomography scanner comprising first and second circular concentric detector arrays. The detectors of the first detector array have an intrinsic spatial resolution that is equal to or better than the intrinsic spatial resolution of the detectors of the second detector array. The method comprises centering the region of interest of the object at a point inside the first and second detector arrays and scanning the object with the scanner.

In yet another aspect the present invention includes an improvement in a PET scanner having a primary PET scanner for providing an image of a region of an object having opposing planar detector arrays spaced by a distance and include at least one detector having an intrinsic spatial resolution. The improvement comprises a PET detector module for providing an image of a region of an object having an accessory planar detector array including at least one accessory detector having an intrinsic spatial resolution at least as good as the intrinsic spatial resolution of the primary scanner detector. The accessory planar detector array is positioned inside an outer boundary defined by the opposing planar detector arrays.

In a final aspect, the present invention includes an improvement in a PET scanner having a primary PET scanner for providing an image of a region of an object having a primary detector array including a plurality of detectors defining an outer boundary and having an intrinsic spatial resolution. The improvement includes a PET detector module for providing an image of a region of an object having an accessory detector array including a plurality of detectors. At least one detector of the accessory detector array has an intrinsic spatial resolution at least as good as the intrinsic spatial resolution of each of the primary scanner detectors. The accessory detector array is positioned inside the outer boundary of the primary detector array.

Other objects of the present invention will be in part apparent and in part pointed out hereinafter.

BRIEF DESCRIPTION OF THE DRAWINGS

FIGS. 8A–8C are schematic front elevations of improved PET scanners having detector modules in accordance with eighth, ninth and tenth embodiments, respectively, of the present invention.

FIGS. 9A–9C are schematic vertical cross sections of improved PET scanner having a detector module in accordance with tenth, eleventh and twelfth embodiments, respectively, of the present invention.

Corresponding reference characters indicate corresponding parts throughout the several views of the drawings.

DETAILED DESCRIPTION OF THE PREFERRED EMBODIMENT

Figure 1:
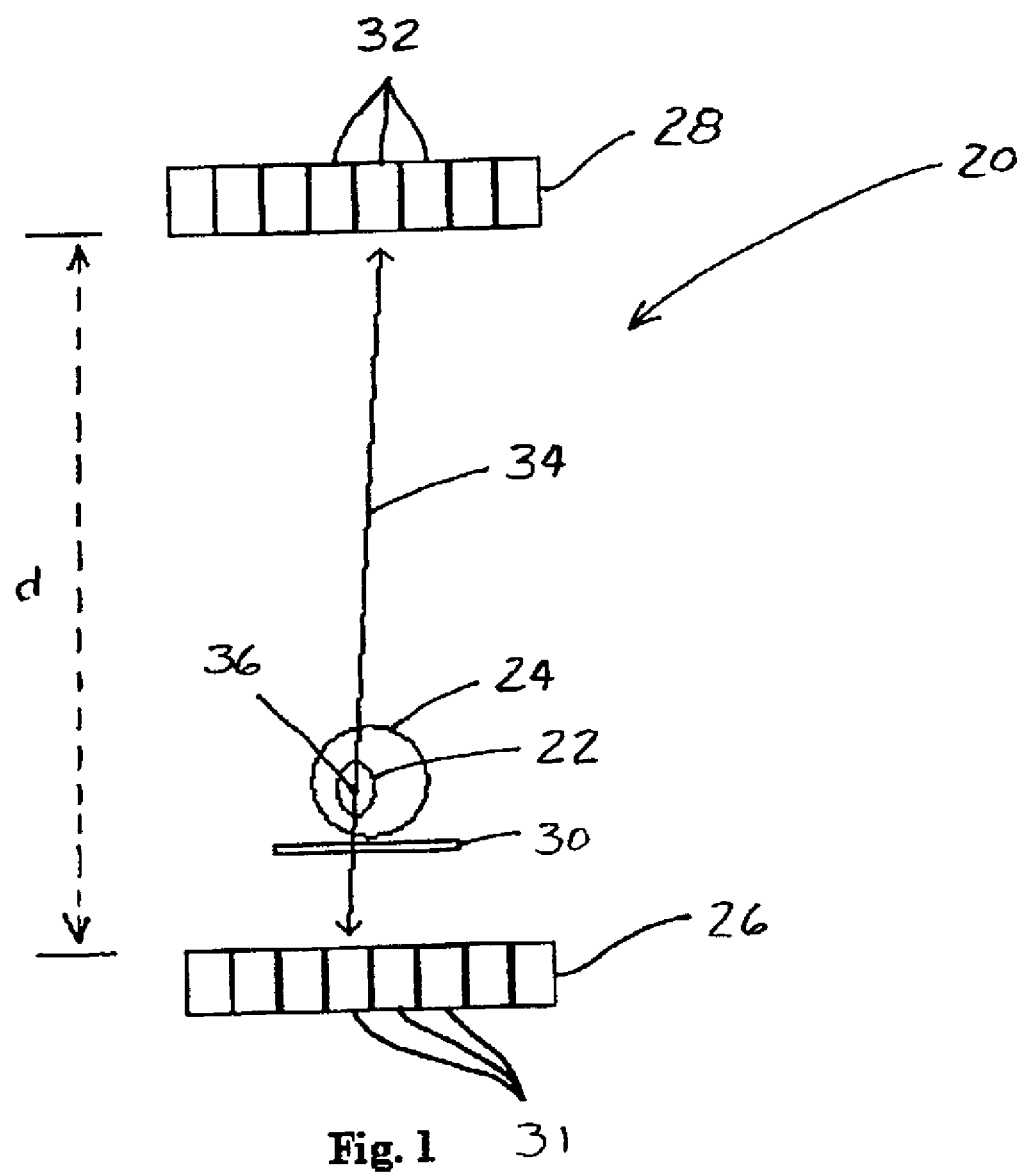
FIG. 1 is a schematic front elevation of a PET scanner having two parallel detector arrays in accordance with a first embodiment of the present invention.
Figure 2:
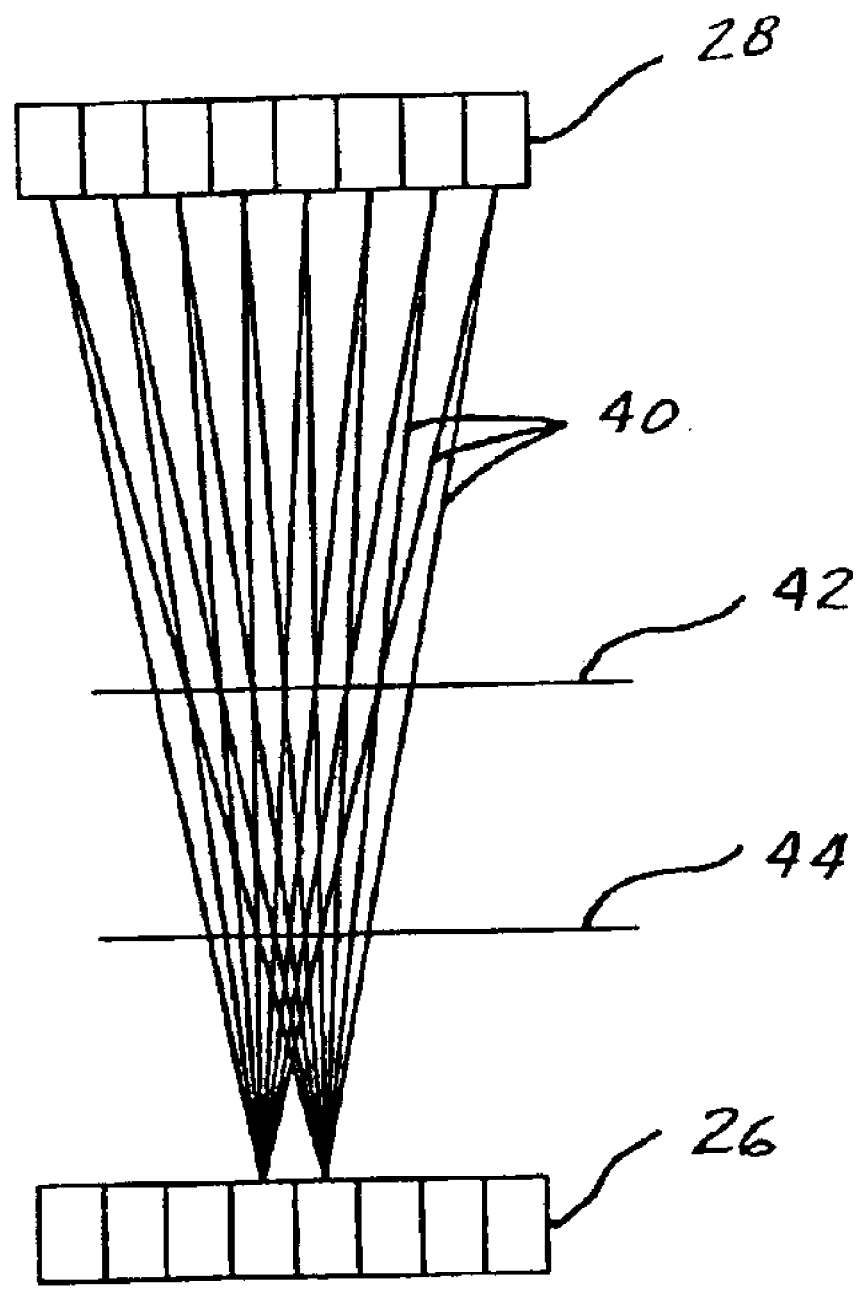
FIG. 2 is a second schematic front elevation of a PET scanner having two parallel detector arrays.
Figure 10:
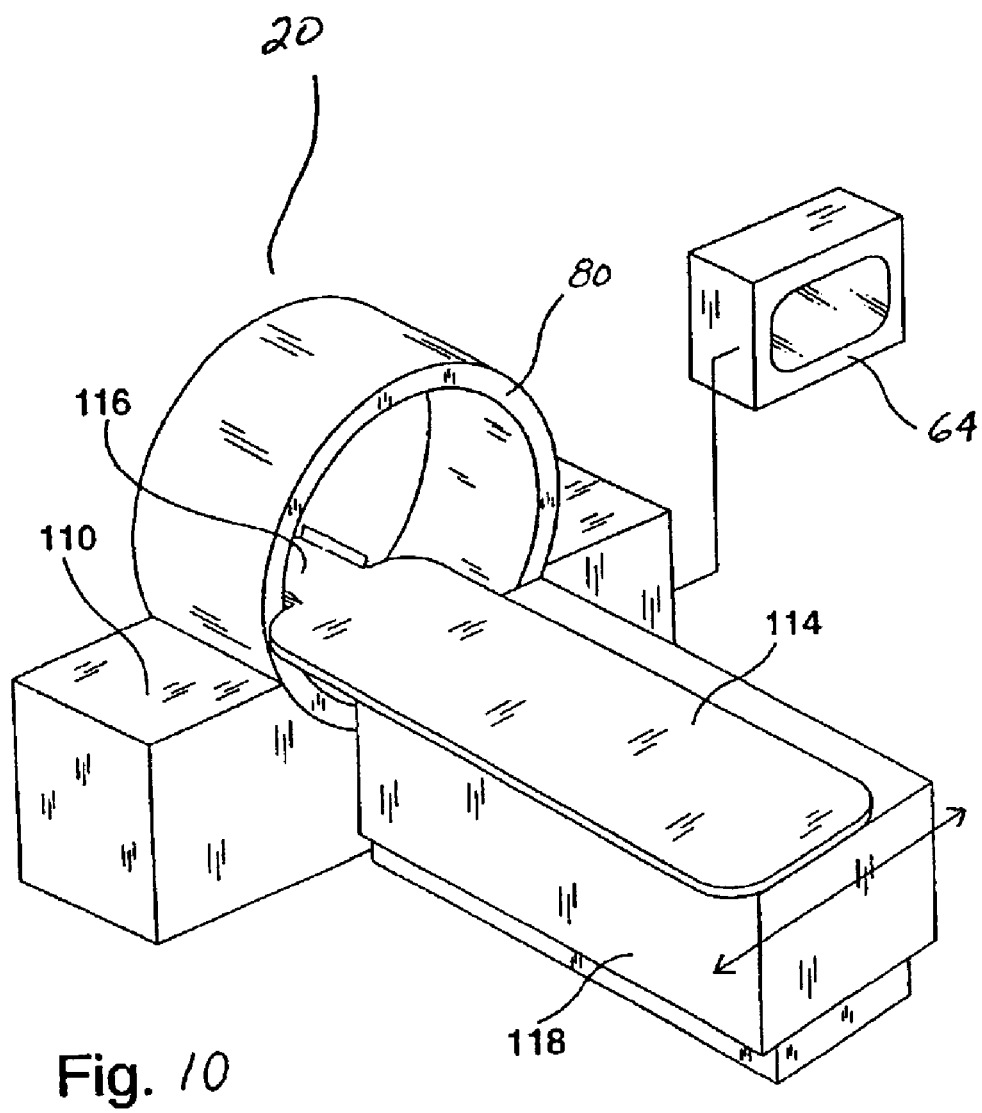
FIG. 10 is a perspective of a PET scanner in accordance with the present invention.

Referring now to the drawings and in particular to FIG. 1, a positron emission tomography ("PET") scanner is designated in its entirety by the reference character 20. The scanner 20 provides an image of a region of interest 22 of an object 24. The scanner 20 comprises opposing first and second detector arrays 26, 28, respectively, spaced by a distance d and a stage 30 for holding the object 24 between the arrays. The first detector array 26 is formed from a series of adjacent gamma-ray photon detectors 31, while the second detector array 28 is formed from a series of adjacent gamma-ray photon detectors 32. The detectors 31 of the first detector array 26 have intrinsic spatial resolutions that are equal to or preferably better than intrinsic resolutions of the detectors 32 of the second detector array 28. Better intrinsic spatial resolution, in other words resolution capable of distinguishing smaller structures of the object, may be achieved through a variety of known methods including, for example, decreasing the size of detectors 31. Detectors 31 and 32 may include scintillation crystals, ionization chambers, semiconductor material or other materials for detecting gamma-ray photons. Detectors 31 and 32 may be of the same type and the same size. Alternatively, detectors 31 and 32 may be of the same type but different sizes, or of different types altogether. During PET scanning, the object 24 is positioned between the arrays 26 and 28 as described below and radiolabeled tracing pharmaceuticals are introduced into the object. As the radioisotopes in the tracing pharmaceuticals decay, they produce positrons. Each positron collides with surrounding matter in the object and eventually combines with an electron and annihilates, producing a pair of gamma-ray photons. The gamma-ray photons travel away from each other in a straight line (e.g., along line 34). When the gamma-ray photons strike the detectors 31 and 32, they are detected. If a pair of detectors 31 and 32 each detect one gamma-ray photon within a predetermined period of time (e.g., within about 5 to about 50 nanoseconds), it is assumed that the gamma-ray photons were produced at some point within the object along the straight line extending between the two detectors (e.g., line 34). As will be apparent to those skilled in the art, a series of lines 40 (e.g., as illustrated in FIG. 2) extend between each pair of detectors 31 and 32 in the first and second arrays 26 and 28. These lines 40 are referred to as "lines of response," and detector arrays 26 and 28 positioned on opposite sides of the object 24 are said to be in coincidence with one another. Photo multipliers and other electronic components (not shown) convert gamma-ray photon strikes into detection data and communicate the detection data to a common coincidence processor such as a computer 64 (FIG. 10). For example, scintillation detectors may be coupled to commercially available photo-detectors such as Hamamatsu R8520U-C12 or to avalanche photo-multiplier coupled with optical fibers. The signals from the photo-detectors or photo-multipliers may be amplified and then transmitted to a coincidence processor. Other methods of converting gamma-ray interactions into electronic detection data are well-known and may also be used with this invention.

The position of the detector where the gamma-ray interaction occurs is determined by a commonly used algorithm that defines the X and Y coordinates of the interaction event. The coordinated are compared to a lookup table to identify the crystal, or other detector element where the gamma-ray interaction took place. The gamma-ray interaction event is encoded with the detector block number, the detector element identification within a block, the event energy, and the time of the detection. This information makes up the detection data transmitted to the coincidence processor and is used in standard image reconstruction.

As further illustrated in FIG. 1, the stage 30 is located between the detector arrays 26 and 28 and is configured to hold the object 24 so the region of interest 22 of the object is located at a specific point 36 between the first and second detector arrays. In some embodiments of the invention, the point 36 where the region of interest 22 is held is at least about ten percent closer to the first detector array 26 than to the second detector array 28. In other words, if the distance between the region of interest 22 and the second detector array 28 is 100 units, the distance between the region of interest 22 and the first detector array 26 is no more than about 90 units. More preferably, the point 36 is about 33% closer to the first array 26 than to the second array 28. Still more preferably, the point 36 is about 67% closer to the first array 26 than to the second array 28. Even more preferably, the point 36 is about eighty percent closer to the first array 26 than to the second array 28. Preferably, the point 36 is no more than about 98% closer to the first detector array 26 than to the second detector array 28 to avoid detector saturation.

Further, in some embodiments of the invention corresponding to PET scanning an animal subject, the point 36 where the region of interest 22 is held is at least about one centimeter closer to the first detector array 26 than to the second detector array 28, if the distance d between arrays 26 and 28 is about twenty centimeters. In other embodiments of the invention corresponding to PET scanning a human subject, the point 36 where the region of interest 22 is held is at least about four centimeters closer to the first detector array 26 than to the second detector array 28, if the distance d between arrays 26 and 28 is eighty centimeters.

More preferably, the point 36 is between about four centimeters and about ten centimeters closer to the first array 26 than to the second array 28, if the distance d between arrays 26 and 28 is about twenty centimeters, corresponding to PET scanning an animal subject. For PET scanning a human subject, the point 36 is preferably between about sixteen centimeters and about forty centimeters closer to the first array 26 than to the second array 28, if the distance d between arrays 26 and 28 is about eighty centimeters.

Still more preferably, for PET scanning an animal subject, the point 36 is about fourteen centimeters closer to the first array 26 than to the second array 28, if the distance d between arrays 26 and 28 is about twenty centimeters. For PET scanning a human subject, the point 36 is still more preferably about fifty-six centimeters closer to the first array 26 than to the second array 28, if the distance d between arrays 26 and 28 is about eighty centimeters. For PET scanning an animal subject, the point 36 is preferably located no closer than about one centimeter to the first array 26, if the distance d between the arrays 26 and 28 is about twenty centimeters. For PET scanning a human subject, the point 36 is preferably located no closer than about four centimeters to the first array 26, if the distance d between the arrays 26 and 28 is about eighty centimeters.

FIG. 2 illustrates the advantages of centering the region of interest 22 of the object 24 as described above rather than as conventionally located (i.e., centered between the detector arrays 26 and 28). As shown in FIG. 2, first and second detector arrays 26 and 28 are positioned parallel to each other. Lines of response 40 are shown between individual detector pairs of the first and second detector arrays 26 and 28, respectively. In the past, objects (not shown) were centered between the arrays on a plane designated 42. The spacing between the lines of response 40 as they intersect this plane 42 is equal to half of the distance between adjacent detectors in arrays 26 and 28. The best image spatial resolution achievable with this sampling distance is approximately the size of the individual detectors. Using conventional techniques that move the object or arrays 26 and 28 a small distance, e.g., one-half or one-quarter of the detector width, the image resolution can approach the theoretical limit of the conventional designs, i.e., the detector intrinsic spatial resolution. By positioning the object closer to the first array 26 than to the second array 28, e.g., on a plane designated 44, and scanning the object, the resolution is improved. The improvement in resolution is represented by two effects: improved sampling and magnified projection. The spacing between the adjacent lines of response 40 as they intersect the plane 44 is reduced compared to the spacing between the adjacent lines of response 40 as they intersect the plane 42. For example, an object placed on a plane 67% closer to array 26 than to array 28 will produce a sampling resolution twice as fine as an object centered between the arrays. Although the usable imaging area of an object placed on plane 44 is smaller than for an object placed on plane 42, the region of interest 22 (as in FIG. 1) of the object 24 (as in FIG. 1) on plane 44 is projected onto the farther detector array 28 with greater magnification compared to conventional techniques. For example, an object placed on a plane 67% closer to array 26 than to array 28 will produce a magnification of two times larger at the farther array 28 compared to an object centered between the arrays. Thus, as will be appreciated by those skilled in the art, centering the region of interest 22 (as in FIG. 1) of the object 24 (as in FIG. 1) at a point closer to the first detector array 26 than to the second detector array 28 can produce an image with spatial resolution higher than the intrinsic resolution of individual detectors in array 28.

The resolution of the scanner may be improved by moving the object relative to the detector arrays or moving the arrays relative to the object. As will be appreciated by those skilled in the art, moving the object or arrays reduces the effective sampling size.

In order to produce a 3-dimensional tomographic image, projections of the object from multiple perspectives are required. To obtain the magnified projections of the object from multiple perspectives, one can either rotate the detector arrays 26 and 28 about the stationary object 24, or rotate the object 24 and keep the detector arrays 26 and 28 stationary. The goal is to acquire the magnified projections of the object with finer sampling size from multiple perspectives, which will result in PET images with enhanced spatial resolution.

Figures 3A, 3B:
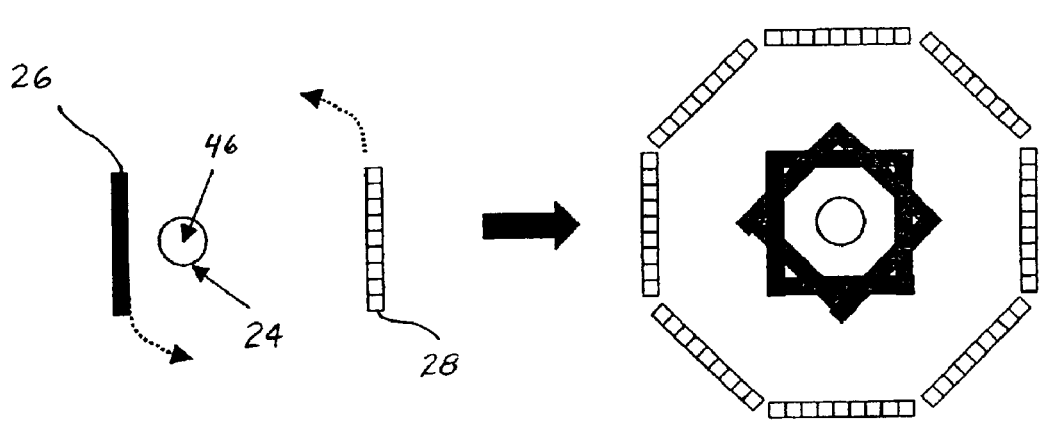
FIGS. 3A–3B are schematic front elevations of a PET scanner having two parallel detector arrays operating in accordance with a second embodiment of the present invention.

One example of this resolution improvement technique is illustrated in FIG. 3A. An object 24 is illustrated centered about a stationary axis 46 and positioned between a first detector array 26 and a second detector array 28 as described above. FIG. 3B illustrates several successive positions of the apparatus achieved by rotating the first detector array 26 and the second detector array 28 about the axis 46. The detector arrays 26 and 28 are rotated, either continuously while scanning the object or in discrete steps, in order to produce magnified projections of the object from multiple perspectives.

Figure 4:
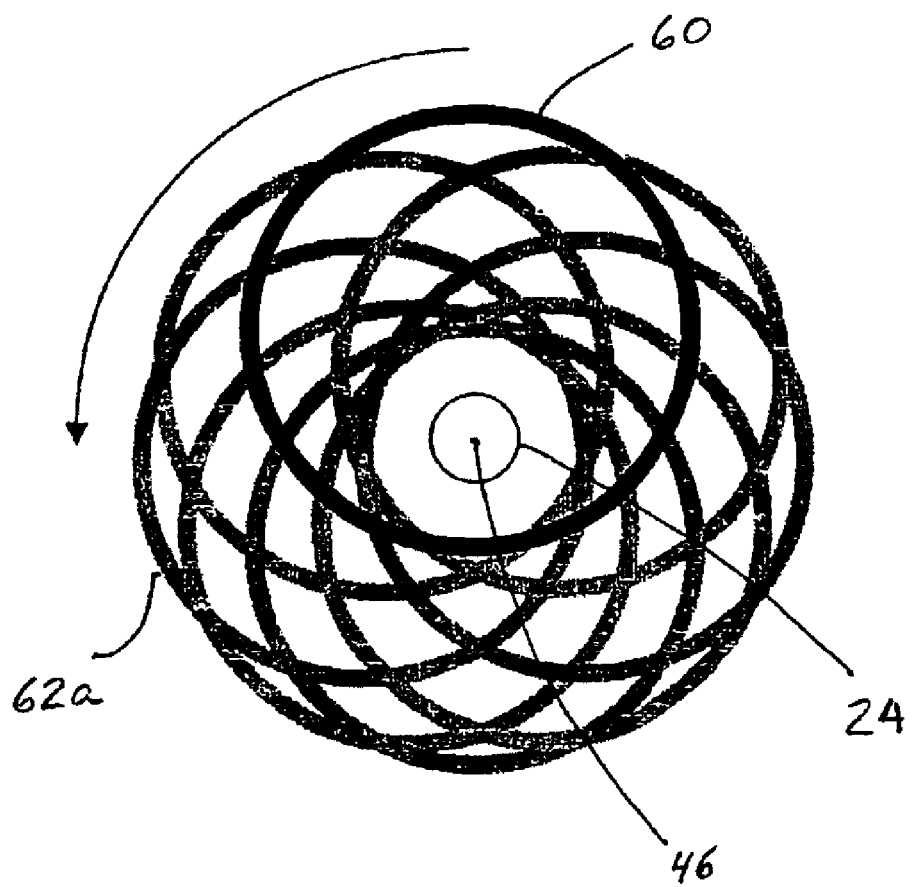
FIG. 4 is schematic front elevation of a PET scanner having a ring of detectors operating in accordance with a third embodiment of the present invention.
Figure 5:
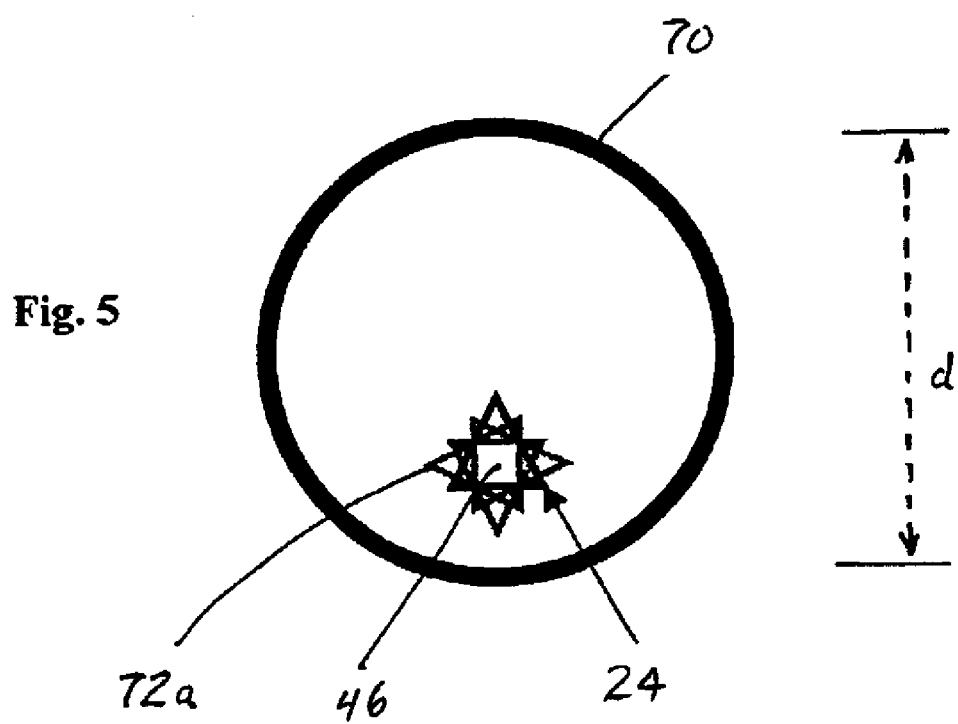
FIG. 5 is a schematic front elevation of a PET scanner having a ring of detectors operating in accordance with a fourth embodiment of the present invention.

FIG. 4 illustrates the first and second detector arrays arranged as a continuous ring detector array 60 having opposing first and second detector arrays (not shown), formed as arcs or halves, separated by a distance d as shown in FIG. 5. The arcs constitute the first or the second detector array. The detectors of the first detector array have intrinsic spatial resolutions that are equal to or preferably better than intrinsic spatial resolutions of the detectors of the second detector array. An object 24 is illustrated centered about a stationary axis 46 and arranged inside the ring detector array 60 at a point closer to the first detector array than the second detector array to achieve the desired magnification effect. The object is scanned while the ring detector array 60 is rotated about the axis 46 either continuously while scanning the object or in discrete steps. One of several successive positions of the apparatus as the ring detector array 60 is rotated about the axis 46 is designated by reference numeral 62a. During the rotation, the first detector array is positioned closer to the object than the second detector array. The high resolution images require only the data from the individual detector pairs that produce a magnification of the object. Therefore, the raw data from all individual detector pairs is analyzed using a computer 64 (FIG. 8) to extract the data corresponding to the magnified projections of the object from multiple perspectives.

FIG. 5 illustrates a ring detector array 70 as previously described with reference to FIG. 4, with an object 24 centered about an axis 46. The object 24 is arranged inside the ring detector array 70 at a point closer to the first detector array than the second detector array to achieve the desired magnification effect. In this embodiment, the ring detector array 70 remains stationary while the object is rotated, either continuously or in discrete steps, about the axis 46 and scanned with the ring detector array 70. One of the several successive positions of the object 24 as it is rotated about the axis 46 is designated by the reference numeral 72a. During the rotation, the object is positioned closer to the first detector array than the second detector array. The high resolution images require only the data from the individual detector pairs that produce a magnification of the object. Therefore, the raw data from all individual detector pairs is analyzed using a computer 64 (FIG. 10) to extract the data corresponding to the magnified projections of the object from multiple perspectives.

Figure 6:
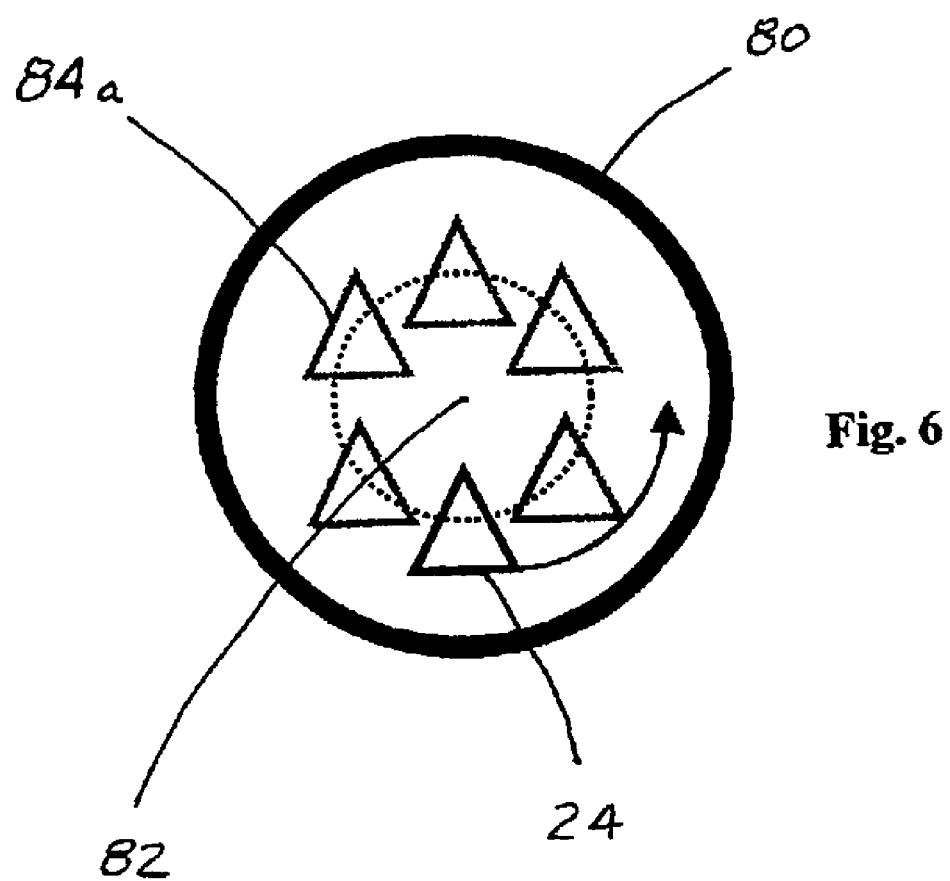
FIG. 6 is a schematic front elevation of a PET scanner having a ring of detectors operating in accordance with a fifth embodiment of the present invention.

FIG. 6 illustrates a ring detector array 80 as previously described with reference to FIG. 4, having a central axis 82 and an object 24 arranged inside the ring detector array at a point closer to the first detector array than the second detector array to achieve the desired magnification effect. In this embodiment, the object 24 orbits either continuously or in discrete steps, about the axis 82 at a predetermined angular rate as it is scanned by the ring detector array 80. The ring detector array 80 rotates about the axis 82 at the same angular rate as the object 24 so the position of object 24 remains closer to the first detector array than the second detector array. One of the several successive positions of the object 24 as it orbits about the axis 82 is designated by the reference numeral 84*a*. The high resolution images require only the data from the individual detector pairs that produce a magnification of the object. Therefore, the raw data from all individual detector pairs is analyzed using a computer 64 (FIG. 10) to extract the data corresponding to the magnified projections of the object from multiple perspectives.

Figure 7A:
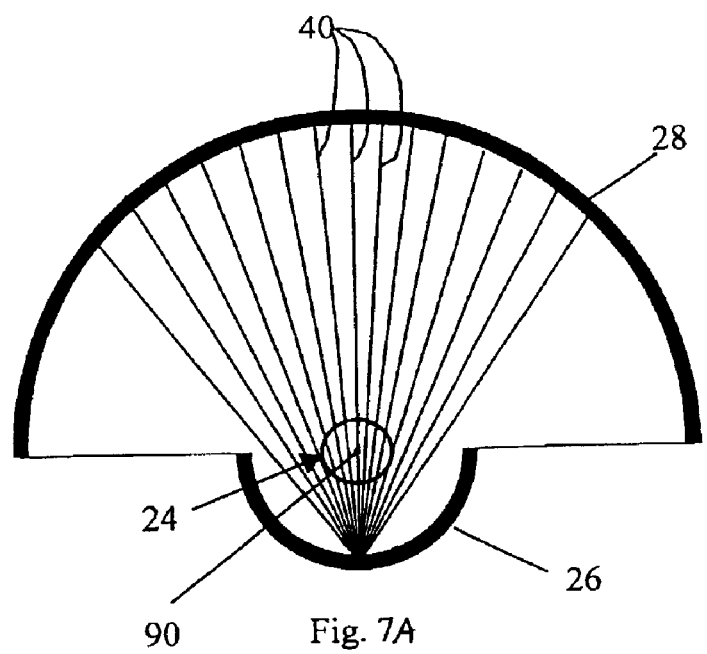
FIG. 7A is a schematic front elevation of a PET scanner of a sixth embodiment of the present invention having two detector arrays arranged in half rings of detectors having different radii.

FIG. 7A illustrates a PET scanner comprising a first detector array 26 and an opposing second detector array 28 each shaped in the form of a half circle having different radii and each centered about a common axis 90. The detectors of the first detector array 26 have intrinsic spatial resolutions equal to or better than intrinsic spatial resolutions of the detectors of the second detector array 28. An object 24 is centered on the axis 90 inside the first detector array 26 and the opposing detector array 28. Lines of response 40 demonstrate that the image of the object projected onto the second detector array 28 is magnified, thus achieving higher resolution. The design of FIG. 7A achieves high resolution images while the first detector array 26 and the second detector array 28 rotate about the axis 90 to produce magnified projections of the object from multiple perspectives. Alternatively, the first detector array 26 and the second detector array 28 can remain stationary and the PET scanner can be used to acquire projections of the object from multiple perspectives at the same time. Although the alternative does not produce magnified projections of the object from all angles, its image resolution is still equal to or better than conventional designs. This embodiment with stationary detector arrays allows dynamic scanning of the object which is important in some PET applications.

Figure 7B:
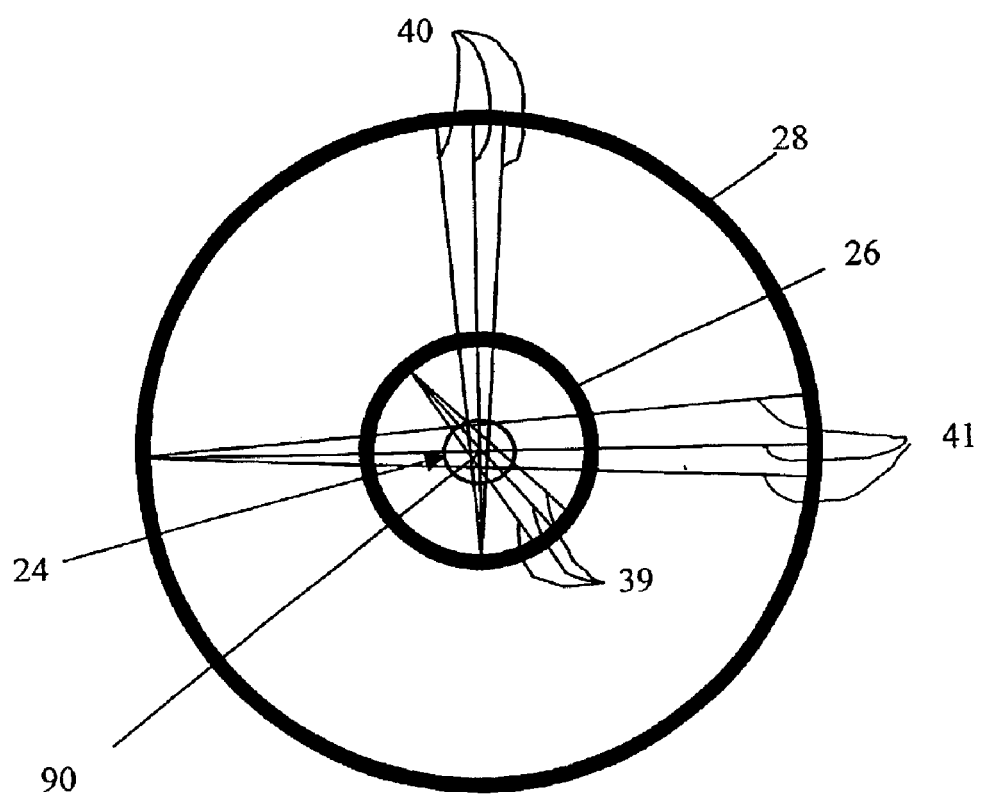
FIG. 7B is a schematic front elevation of a PET scanner of a seventh embodiment of the present invention having two detector arrays arranged in full rings of detectors having different radii.

FIG. 7B illustrates a PET scanner comprising a first detector array 26 and a second detector array 28 each shaped in the form of a full circle having different radii and each centered about a common axis 90. The detectors of the first detector array 26 have intrinsic spatial resolutions equal to or better than intrinsic spatial resolutions of the detectors of the second detector array 28. An object 24 is centered on the axis 90 inside the first detector array 26 and the second detector array 28. Because gamma rays carry high energy and can penetrate materials, some gamma rays originating from the object 24 pass through the inner detector array 26 without interaction and are detected by the outer detector array 28. Therefore, lines of response can extend between the first (inner) detector array 26 and the second (outer) detector array 28 (designated by 40), or between opposing halves of the inner detector array 26 (designated by 39), and between opposing halves of the outer detector array 28 (designated by 41). Because the lower half of the inner detector array 26 and the upper half of the outer detector array 28 resemble the design in FIG. 7A, the scanner shown in FIG. 7B can be thought of as two scanners such as shown in FIG. 7A being combined together. There are at least two advantages to the configuration shown in FIG. 7B. First, it eliminates the moving parts. Second, it acquires both "conventional PET images" and "high resolution images" at the same time. Data collected from lines of response 39 and 41 can be used to reconstruct PET images with conventional resolution, while data from lines of response 40 can provide high resolution images as described above.

Those skilled in the art will appreciate that the invention disclosed herein can be adapted to improve existing, commercially available conventional PET scanners.

FIG. 8A illustrates an embodiment of an improved PET scanner comprising a primary scanner having a circular detector array 48. The circular detector array 48 encircles a cylindrical volume (having a cylindrical outer boundary and planar ends (designated by lines 56 and 58 in FIGS. 9A–9C) and include a plurality of detectors (not shown) having intrinsic spatial resolutions of about 3 to about 15 millimeters. The improvement comprises at least one secondary PET detector module positioned inside the cylindrical boundary of the primary PET scanner, and whose imaging data can be combined with that of the primary PET scanner using a computer 64 (FIG. 10). The secondary PET detector module comprises at least one accessory detector array 50, configured for example in the form of a half ring and having one or more accessory detectors (not shown). The intrinsic spatial resolutions of the accessory detectors are equal to or better than the intrinsic spatial resolutions of the detectors of the circular detector arrays 48. The accessory detector array 50 can be positioned close to the object 24. Lines of response 40 extend from the accessory detector array 50 to the circular detector arrays 48 and demonstrate that the image of the object projected onto the circular detector array 48 is magnified, thus achieving higher resolution. The design of FIG. 8A achieves high resolution images while the accessory detector array 50 rotates around the object 24 to produce magnified projections of the object from multiple perspectives. Alternatively, the accessory detector array 50 can remain stationary and the secondary PET detector module can be used to acquire projections of the object from multiple perspectives at the same time.

Alternatively, a person skilled in the art will appreciate that the magnification effects achieved with the secondary PET detector module illustrated in FIG. 8A can be achieved using planar detector arrays.

FIG. 8B illustrates an improved PET scanner having at least one circular detector array 48. The circular detector arrays 48 include a plurality of detectors (not shown) having intrinsic spatial resolutions of about 3 to about 15 mm. The improvement can be used for, among other things, imaging breast tissue and comprises a secondary PET detector module having a plurality of accessory detector arrays 52. The secondary PET detector module is arranged so that the accessory detector arrays 52 are positioned inside the cylindrical boundary of the primary PET scanner. In this embodiment, the accessory detector arrays 52 are formed as adjacent arcs configured to receive human breasts. Each arc has a plurality of accessory detectors (not shown). The intrinsic resolutions of the accessory detectors are equal to or better than the intrinsic resolutions of the detectors of the circular detectors array 48. Lines of response 40 extend from each of the accessory detector arrays 52 to the circular detector array 48 and demonstrate that the image of the object projected onto the circular detector arrays 48 is magnified, thus achieving higher resolution. The plurality of accessory detector arrays 52 can remain stationary and the secondary PET detector module can be used to acquire simultaneous projections of the object from multiple perspectives.

FIG. 8C illustrates an improved PET scanner having at least one circular detector array 48. The array 48 includes a plurality of detectors (not shown) that have intrinsic spatial resolutions of about 3 mm to about 15 mm. The improvement comprises a secondary PET detector module positioned inside the cylindrical boundary of the primary PET scanner, and whose data can be combined with that of the primary PET scanner using a computer 64 (FIG. 10). The secondary PET detector module includes at least one accessory detector array 54, configured for example as a ring detector, having at least one accessory detector (not shown). The intrinsic spatial resolutions of the accessory detectors is equal to or better than the intrinsic spatial resolution of the detectors of the primary detector array 48. The design of FIG. 8C achieves high resolution while the circular-detector array 48 and the accessory detector arrays 54 remain stationary. Lines of response 40 extend from the accessory detector array 54 to the circular detector arrays 48 and demonstrate that the image of the object projected onto the circular detector arrays 48 is magnified, thus achieving higher resolution. Lines of response 41 extend from and to opposing sides of the circular detector arrays 48 demonstrating that images of the object with conventional intrinsic spatial resolution may be obtained. Alternatively, the design can capture enhanced high resolution images as shown with lines of response 39 extending from and to the accessory detectors of the accessory detector arrays 54.

As previously described, the accessory detector arrays 54 are preferably positioned inside the outer boundary formed by the primary scanner. However, as illustrated in FIGS. 9A–9C, the accessory detector arrays 54 can be positioned between or entirely outside the planar ends of the primary scanner designated by lines 56 and 58. Because lines of response extend in all directions, coincidence events between the accessory detector arrays 54 and the primary detector array 48 can be captured and the image of an object reconstructed using the computer 64 (FIG. 10) and standard image reconstruction techniques.

As will be apparent to a person skilled in the art, detector arrays 48 and the accessory detector arrays may have various configurations and may have various positions with respect to each other while still achieving the benefits of the present invention.

Integration of the detection data from the detector module with the detection data from the PET scanner may be accomplished using some of the data channels of the PET scanner. For example, the channels used for transmitting detection data from one of the circular detector arrays 48 may be rerouted and configured using standard electronic techniques for transmitting detection data from the PET detector module to the coincidence processor. The coincidence processor compares the detection data from the PET detector module with the detection data from the PET scanner to determine the time and position of coincidence events.

In those embodiments that include a PET detector module (FIGS. 8A–8C and 9A–9C), the detection data processing scheme will involve three sets of data. The first set of data includes the coincidence events detected by the accessory detectors of the accessory detector arrays 50, 52 or 54 and the circular detector arrays 48. The second set of data includes the coincident events detected by accessory detectors of the accessory detector arrays 50, 52 and 54. The third set of data includes the coincidence events detected by the detectors of the circular detector array 48. These data sets are registered in a full three-dimensional sinogram. The sinograms are used to reconstruct an image of the object using standard imaging techniques.

FIG. 10 illustrates a PET scanner 20 comprising a ring detector array 80 mounted on a gantry 110. A patient bed 114 having a stage 116 is shown slidably mounted on a pedestal 118. The ring detector array 80 comprises detectors (not shown). A computer 64 is provided to control the ring detector array 80, the patient bed 114, and the pedestal 118. The computer 64 also collects and analyzes the data from the ring detector array 80.

The apparatus or method of the present invention adds versatility to PET scanners that can be used in several modes. If the object is positioned in the center of a PET scanner 20 (not shown), images can be acquired conventionally. If the object is positioned as illustrated in FIG. 10, the system is in high-resolution mode. This mode allows one to "zoom in" on the object to view the region of interest with higher resolution. Alternatively, the ring detector array 80 may have detectors (not shown) having different intrinsic spatial resolutions. By positioning the patient bed 114 and the object closer to those detectors that have higher intrinsic spatial resolution, an enhanced high-resolution mode is achieved. Existing PET scanners such as ART or HR-plus scanners available from CTI/Siemens AG, Advantage scanners available from General Electric Company, Allegro scanners available from Royal Philips Electronics, micro-PET scanners available from Concorde Microsystems Inc. and others may be adapted to operate in accordance with the invention as illustrated in FIGS. 8A–8C. Also, future PET scanner designs may benefit from this invention.

Figure 11:
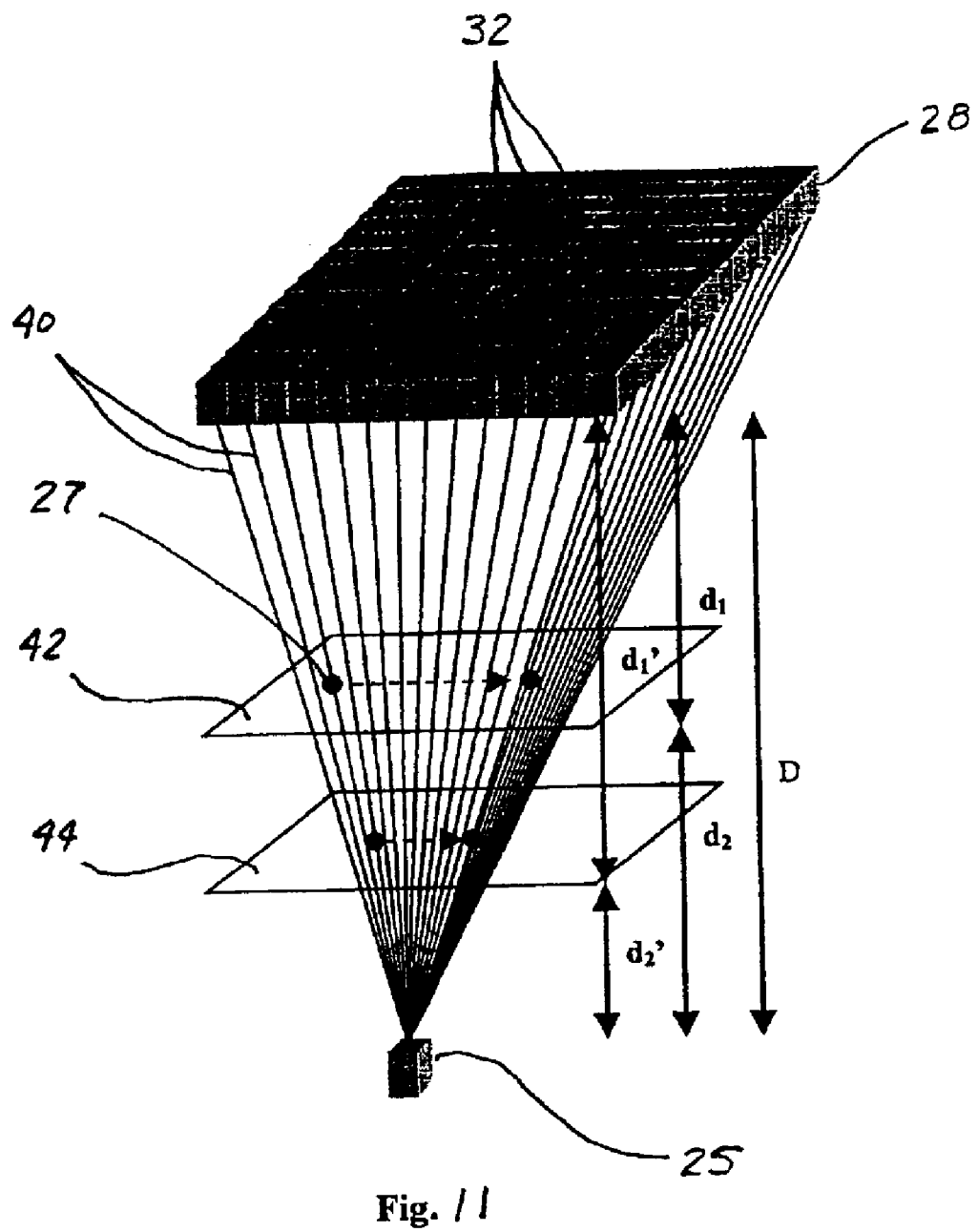
FIG. 11 is a schematic perspective of a PET scanner used for the experimental results represented in FIGS. 12–14.
Figures 12A, 12B, 12C, 12D, 12E, 12F, 12G:
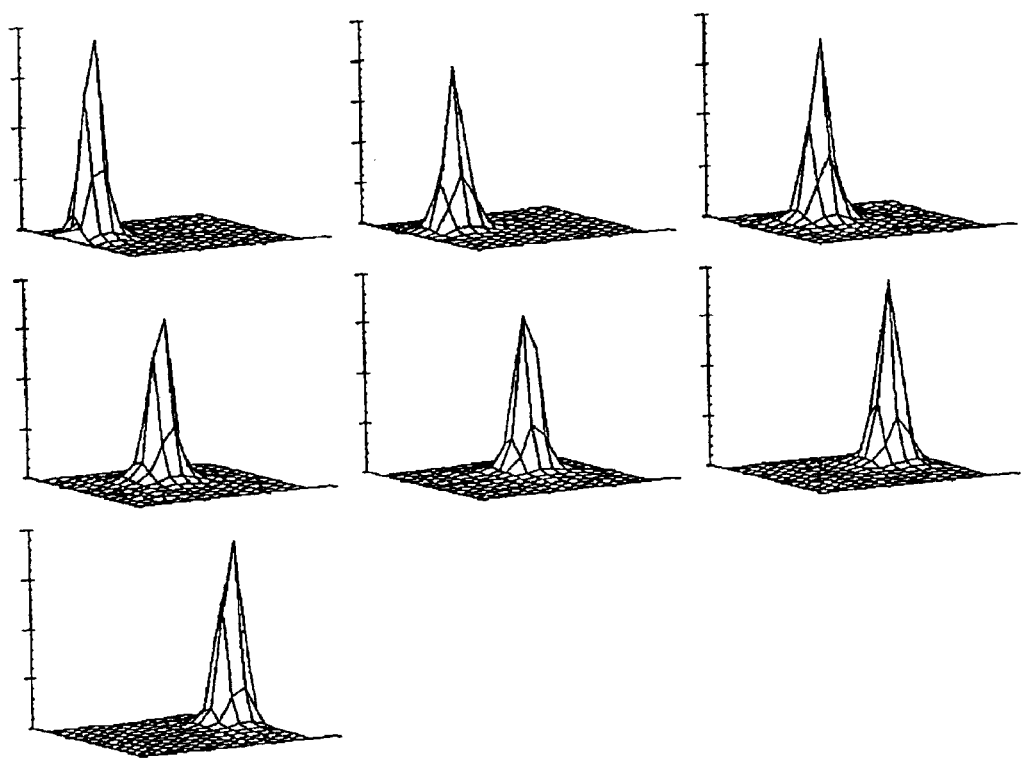
FIGS. 12A–12G are graphs illustrating the experimental results obtained using a conventional scanning method.
Figures 13A, 13B, 13C, 13D:
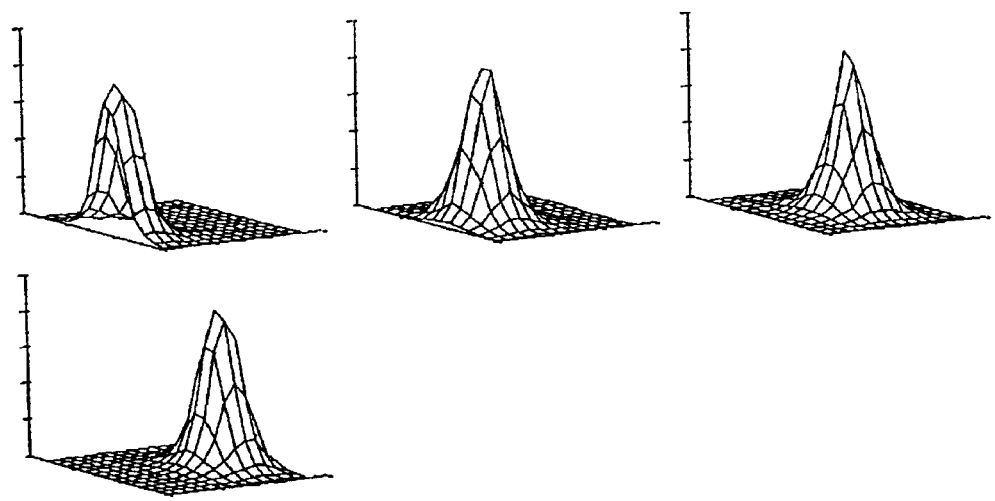
FIGS. 13A–13D are graphs illustrating the experimental results obtained using the scanning method of an embodiment of the present invention.

An experimental PET scanner arrangement illustrated in FIG. 11 has been successfully tested in the laboratory. The results are illustrated in FIGS. 12–14.

FIG. 11 illustrates the PET scanner used for performing the experiments. The PET scanner consisted of an upper detector array 28 consisting of 14×14 scintillation detectors 32 and a lower detector "array" 25 consisting of a single scintillation detector. The scintillation detectors were made of lutetium oxyorthosilicate (LSO) crystals. The crystals were individually cut to 1×1×12.5 mm$^3$ and polished to optical grade for optimal light collection. The crystal pitch (i.e., center-to-center distance between adjacent crystals) was 1.15 mm to accommodate the reflective material inserted between the crystals for optical isolation purposes. The entire array 28 measured 16.1×16.1×12.5 mm$^3$. The photodetectors behind these scintillation crystals were Hamamatsu H7546 64-channel photomultiplier tubes.

The separation between the upper and lower detector arrays was fixed at a total distance D of 12.5 cm during the entire series of tests. The positron-emitting sample 27 in these experiments was a $^{22}$Na point source approximately 0.6 mm in diameter, embedded in a plastic casing. In the first test representing conventional PET scanning methods, the sample 27 was stepped through the imaging field of view along a plane 42 with a step size of 1.0 mm. Coincidence events between the upper and lower detector arrays were recorded for five minutes at each location. Each of the 196 scintillating detectors on the upper detector array 28 formed a line of response 40 with the lower detector "array" 25 consisting of a single scintillating detector. If a line of response 40 passed through the sample 27, it detected the annihilating event. The number of annihilating events detected by the individual scintillating detectors 32 of the upper detector array 28, in coincidence with the scintillating detector array 25, were sorted into a 2-dimensional histogram presented as surface plots in FIGS. 12A–12G. As the point sample 27 stepped through the central plane, the peak of the detected events moved from one side of the plots in FIGS. 12A–12G to the other. In the first test, it took more than 7 steps to move the sample 27 out of the detectable Field of View, indicating a minimum of 8×8 mm² usable imaging Field of View.

In the second test representing an embodiment of the present invention, the sample 27 was moved to plane 44, ¼ of the total distance D (3.1 cm) from the lower detector "array" 25, and ¾ of the total distance D (9.4 cm) from the upper detector array 28. Data was collected and sorted into a 2-dimensional histogram presented as surface plots in FIGS. 13A–13D. With the same step size of 1.0 mm as in test 1, it took only 4 steps to move the sample 27 out of the Field of View, indicating that the usable imaging Filed of View was around 4×4 mm². The surface plots of FIGS. 13A–13D also illustrate that the projection of the point source covers a much larger surface area of the detector array, demonstrating the magnification effect of the present invention.

Figures 14A, 14B, 14C:
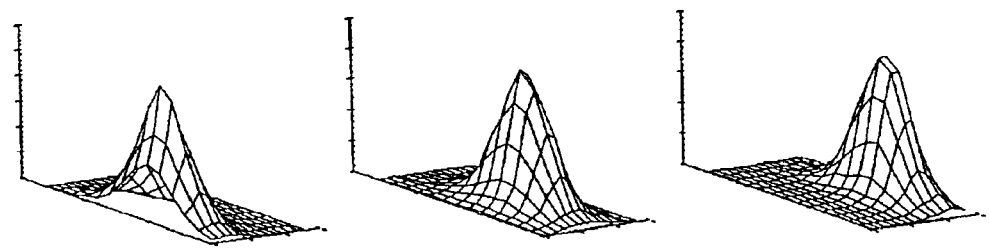
FIGS. 14A–14C are graphs illustrating the experimental results obtained using the scanning method of another embodiment of the present invention.

In the final test (not shown in FIG. 11) representing another embodiment of the present invention, the sample 27 was moved to ⅕ of the total distance D (2.5 cm) from the lower detector "array" 25, and ⅘ of the total distance D (10 cm) from the upper detector array 28. Data was collected and sorted into a 2-dimensional histogram presented as surface plots in FIGS. 14A–14C. It only took three steps to cover the entire Field of View, indicating an even smaller usable imaging Field of View of around 3×3 mm². The surface plots of FIGS. 14A–14C show that the projection of the point source covers an even larger surface area of the detector array, demonstrating the magnification effect of the present invention.

The detected annihilation event count rate between the upper and lower detector arrays 28 and 25 was found to be 30 cps ("counts per second"), 120 cps, and 180 cps for tests 1, 2 and 3, respectively. The reason that the detection efficiency increased 4 and 6 times in test 2 and 3, respectively, compared to test 1, was due to the small sample 27 distribution and a single scintillating detector making up the lower detector "array" 25. All coincidence events that were detected by the lower detector "array" 25 fell completely within the surface area of the upper detector array 28 in all three configurations. Therefore, there was no detection efficiency loss for the upper detector array 28 when the sample 27 was moved away from the upper detector array 28. The coincidence detecting efficiency gain was therefore the same as the efficiency gain of the lower detector "array" 25. For a scanner that has a much larger number of scintillating detectors 32 both at the upper and lower detector arrays, the improvement in detecting efficiency would be reduced to approximately 77% and 144% for the configurations in test 2 and 3, compared to the configuration in test 1.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A positron emission tomography scanner for providing an image of a region of interest of an object, said scanner comprising:

opposing first and second detector arrays, each of said first and second detector arrays being formed as an arc of a circle, wherein the radius of the arc of the first detector array is less than the radius of the arc of the second detector array;

a stage for holding the object between said first and second detector arrays, said stage being located to center the region of interest of the object at a point between the first and second detector arrays, said point being at least about ten percent closer to said first detector array than to said second detector array.

2. A positron emission tomography scanner as set forth in claim 1 wherein each of said first and second detector arrays has at least one detector having an intrinsic spatial resolution, and wherein the intrinsic spatial resolution of at least one of the detectors of said first detector array is at least as great as the intrinsic spatial resolution of at least one of the detectors of said second detector array.

3. A positron emission tomography scanner as set forth in claim 2 wherein the intrinsic spatial resolution of each detector of the first detector array is greater than the intrinsic spatial resolution of each detector of the second detector array.

4. A positron emission tomography scanner as set forth in claim 1 wherein each of said first and second detector arrays are formed as a half circle.

5. A positron emission tomography scanner as set forth in claim 1 wherein the arc of the first detector array and the arc of the second detector array are centered about a common axis.

6. A positron emission tomography scanner as set forth in claim 1 wherein the point us at least about thirty-three percent closer to said first detector array than to said second detector array.

7. A positron emission tomography scanner as set forth in claim 6 wherein the point is at least about sixty-seven percent closer to said first detector array than to said second detector array.

8. A positron emission tomography scanner as set forth in claim 7 wherein the point is about eighty-two percent closer to said first detector array than to said second detector array.

9. A positron emission tomography scanner as set forth in claim 1 wherein the point is no more than about ninety-eight percent closer to said first detector array than to said second detector array.

10. A positron emission tomography scanner as set forth in claim 1 wherein at least one of said arcs extends about 360 degrees around a central axis.

11. A positron emission tomography scanner as set forth in claim 1 wherein said arcs are concentric.

12. A method of increasing resolution of an image of a region of interest of an object provided by a positron emission tomography scanner comprising opposing first and second detector arrays, said first and second detector arrays each being formed as an arc of a circle, wherein the radius of the circle of the arc of the first detector array is less than the radius of the circle of the arc of the second detector array, said method comprising the steps of:

centering the region of interest of the object at a point between the first and second detector arrays which is at least about ten percent closer to said first detector array than to said second detector array; and scanning the object with the scanner.

13. A method as set forth in claim 12 wherein each of said first and second detector arrays has at least one detector having an intrinsic spatial resolution, and wherein the intrinsic spatial resolution of at least one of the detectors of said first detector array is at least as great as the intrinsic spatial resolution of at least one of the detectors of said second detector array.

14. A method as set forth in claim 13 wherein the intrinsic spatial resolution of each detector of the first detector array is greater than the intrinsic spatial resolution of each detector of the second detector array.

15. A method as set forth in claim 12 further comprising the steps of:

moving said object relative to said first and second detector arrays; and rescanning the object with the scanner.

16. A method as set forth in claim 15 wherein the object is scanned after being moved.

17. A method as set forth in claim 15 wherein the object is scanned while being moved.

18. A method as set forth in claim 15 wherein the object is rotated relative to said first and second detector arrays.

19. A method as set forth in claim 12 further comprising the steps of:

moving at least one of said first and second detector arrays relative to said abject; and rescanning the object with the scanner.

20. A method as set forth in claim 19 wherein the step of moving the arrays comprises rotating said first and second detector arrays about an axis.

21. A method as set forth in claim 20 wherein the axis is closer to the first array than to said second array.

22. A method as set forth in claim 21 wherein the axis extends through the region of interest of the object.

23. A positron emission tomography scanner for providing an image of a region of interest of an object, said scanner comprising:

a first circular detector array;

a second circular detector array concentric with said first detector array; and a stage for holding the object inside said first and second detector arrays;

wherein said first detector array is at least about ten percent smaller than said second detector array.

24. A positron emission tomography scanner as set forth in claim 23 first detector array is at least about thirty-three percent smaller than said second detector array.

25. A positron emission tomography scanner as set forth in claim 24 first detector array is at least about sixty-seven percent smaller than said second detector array.

26. A positron emission tomography scanner as set forth in claim 23 wherein said stage is located to center the region of interest of the object at a point concentric with the first and second detector arrays.

27. In a positron emission tomography scanner having a primary positron emission tomography scanner for providing an image of a region of an object, said primary scanner having opposing detector arrays spaced by a distance, each of said detector arrays including at least one detector having an intrinsic spatial resolution, an improvement comprising a secondary positron emission tomography scanner for providing an image of a region of an object said secondary scanner comprising an accessory detector array including at least one detector having an intrinsic spatial resolution, said accessory detector array being positioned inside an outer boundary defined by said opposing detector arrays of the primary scanner.

28. An improvement as set forth in claim 27 wherein the intrinsic spatial resolution of at least one detector of the accessory detector array is at least as great as the intrinsic spatial resolution of at least one detector of the primary positron emission tomography scanner.

29. In a positron emission tomography scanner having a primary positron emission tomography scanner for providing an image of a region of an object, said primary scanner having a primary detector array including a plurality of detectors defining an outer boundary, each of said detectors having an intrinsic spatial resolution, the improvement comprising a secondary positron emission tomography scanner for providing an image of a region of an object, said secondary scanner comprising an accessory detector array including at least one detector having an intrinsic spatial resolution, said accessory detector array being positioned inside the outer boundary of said primary detector array.

30. An improvement as set forth in claim 29 wherein the intrinsic spatial resolution of at least one detector of the accessory detector array is at least as great as the intrinsic spatial resolution of at least one detector of the primary detector array.

31. A positron emission tomography scanner for providing an image of a region of interest of an object, said scanner comprising:

opposing first and second detector arrays spaced by a distance; and a third detector array;

wherein the region of interest of the object is positioned between said first and second detector arrays; and wherein at least a portion of the third detector array is positioned between the object and at least one of said first and second detector arrays.

* * * * *